United States Patent [19]

Hufnagel et al.

[11] Patent Number: 4,595,738
[45] Date of Patent: Jun. 17, 1986

[54] POLYPROPYLENE FILM

[75] Inventors: Walter Hufnagel, Forchheim; Heinz Vates, Fürth-Stadeln, both of Fed. Rep. of Germany

[73] Assignee: Internationale Octrooi Maatschappij "Octropa" B.V., Rotterdam, Netherlands

[21] Appl. No.: 717,573

[22] Filed: Mar. 29, 1985

Related U.S. Application Data

[63] Continuation of Ser. No. 151,911, May 21, 1980, abandoned.

[30] Foreign Application Priority Data

May 21, 1979 [DE] Fed. Rep. of Germany ....... 2920514

[51] Int. Cl.$^4$ .............................................. C08J 5/18
[52] U.S. Cl. ................................................ 526/348.1
[58] Field of Search ...................................... 526/348.1

[56] References Cited

U.S. PATENT DOCUMENTS

| 3,324,218 | 6/1967 | Gebler | 264/210 |
| 4,185,148 | 1/1980 | Sato | 526/348.1 |
| 4,283,463 | 8/1981 | Shiga | 428/512 |

Primary Examiner—Paul R. Michl
Attorney, Agent, or Firm—Cushman, Darby & Cushman

[57] ABSTRACT

A simultaneously biaxially oriented, isotactic polypropylene film resistant to dynamic stresses, particularly tensile stresses in longitudinal direction, which has been stretched in a surface stretch ratio of at least 1:45, exhibiting a specific puncture resistance and certain elongation factors, is particularly suitable as a base or carrier film for acoustical and optical information, for adhesive tape, for multicolor printing, for packaging material and as a layer in laminates.

6 Claims, 2 Drawing Figures

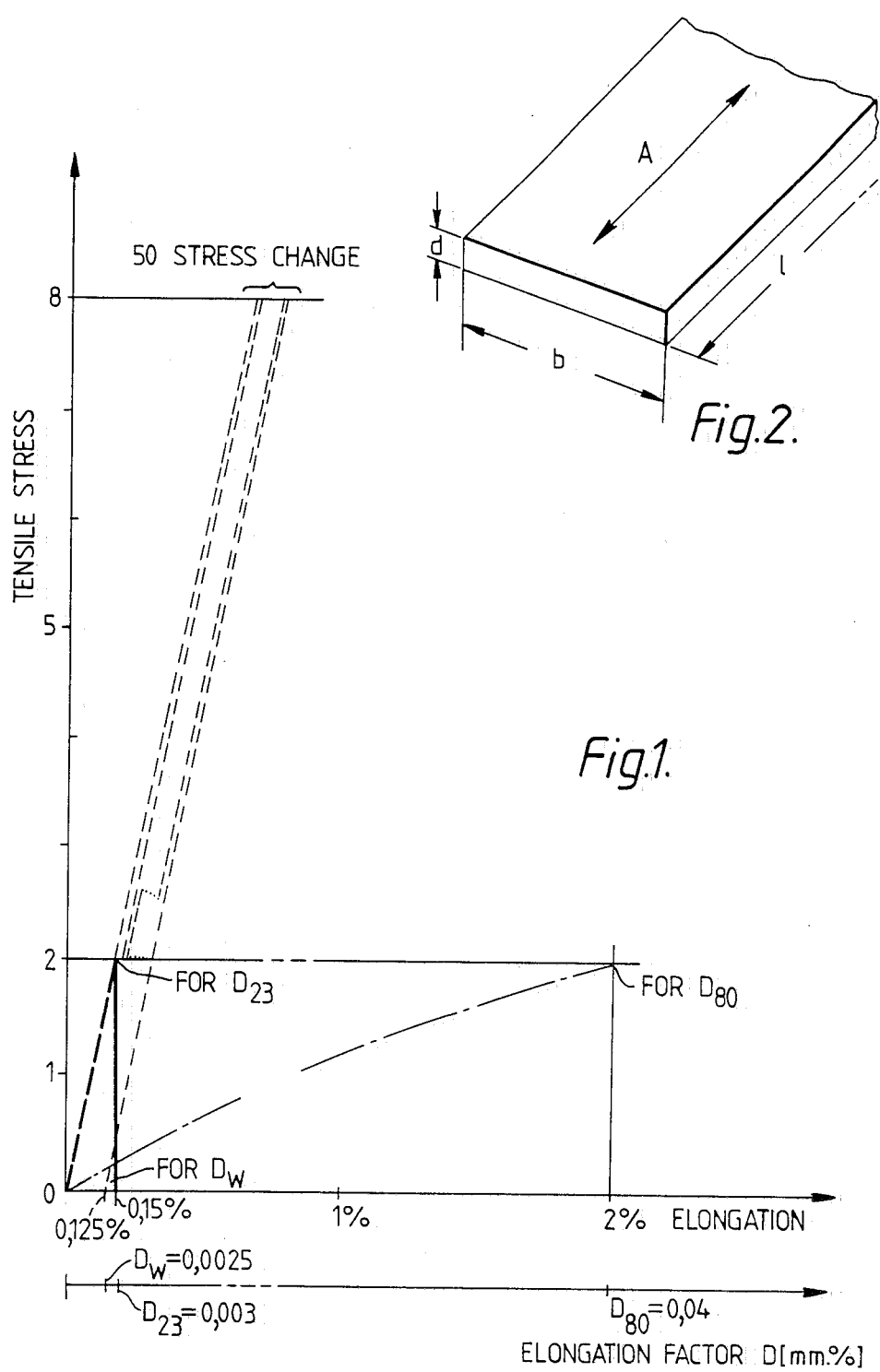

POLYPROPYLENE FILM

This is a continuation of application Ser. No. 151,911 filed May 21, 1980, now abandoned.

The invention relates to a simultaneously biaxially stretched polypropylene film, which after its manufacture, during its further processing and/or in use is exposed to dynamic stresses, particularly tensile stresses in the direction of running of the machine at its manufacture. The invention particularly relates to carrier films.

By dynamic stressed are to be understood in this specification tensile stresses of short duration, in which a film is subjected mostly several times to elongation, without the tensile strength being exceeded and/or the elongation leading to fracture. The dynamic stresses may occur in a film when it is, for example, re-reeled, coated, printed or processed in a packaging machine. Other dynamic stresses with subsequent release occur in recording or registering carriers, which are frequently accelerated and stopped with jerks. The dynamic stresses may occur at room temperature or at elevated temperatures.

Known data for characterizing the mechanical properties of films, such as e.g. tear strength, do not give a satisfactory indication as to permissible dynamic stresses and elongations to be observed, which are to be expected during processing and use of the films.

The deformation of crystalline plastics materials owing to stresses much depends on the crystal structure. For the polypropylene films referred to in this specification isotactic polypropylene is used. During manufacture the film is simultaneously biaxially stretched as a flat film and simultaneously oriented. As a result of the stretching the film should be stretched out, i.e. the stretching is effected at a temperature that enables the orientation, up to about the practically achievable maximum stretching degree. A stretched-out polypropylene film has a stretching degree of at least 1:45, i.e. the surface of the initial extruded film is enlarged 45 times by the stretching. The stretching-out results in a uniform thickness of the film. For polypropylene films theoretically a stretching degree of about 1:49, should be attainable, but in practice deviations occur and also stretching degrees of over 1:50 are possible. In a balanced biaxial stretching the polypropylene film has been stretched in longitudinal and transverse directions in a ratio of about 1:7 each and has the same mechanical properties in both these directions. The polypropylene films meant here have been stretched out in a balanced manner or have been stretched-out in such a way that the stretching degree in longitudinal direction is predominant over the stretching degree in transverse direction. By longitudinal direction of the film is to be understood the direction of running of the machine, which usually is also the direction of running in further processing and in use.

In the range of small stresses and in the case of elongations of up to 5% polypropylene films are considered elastic, it being assumed that an elongation of up to 5% is completely reversible on release. However, this view is inaccurate, since also a stretched-out polypropylene film is still a visco-elastic material, in which also slight deformations produce a portion of irreversible stretching in addition to a portion of elastic, reversible stretching. The result of this may be, for example, that in a multicolour printing machine with interposed, heated drying zones the frequently occurring dynamic tensile stresses cause the printing images of the separate colours to shift and the exact length of the individual printed sections on the web is only difficult to control. Of course, the lengthening of the web can be reduced empirically by choosing a thicker film, but this not only is more expensive on account of the larger amount of raw material used for a certain length of film, but may also have further disadvantages, such as e.g. fewer windings on a roll of a specific diameter.

It is known to characterize films also by a value $F_5$. This value indicates the tensile strength measured at an elongation of 5% (U.S. Pat. No. 2,995,779, column 4, 66–68 and U.S. Pat. No. 3,962,183, column 3, lines 5 and 6). However, this value can only be used if elongations up to 5% are allowed and if the portion of irreversible elongation is negligible. In any case this value is unsuitable for indicating a residual portion of irreversible elongation.

The polypropylene film according to the invention should resist the stresses occurring on further processing and in use, but should not exceed permissible slight elongations and should not be overdimensioned with regard to its thickness. According to processes known per se, the film is extruded or cast on a cooling cylinder and subsequently stretched out biaxially as a flat film and oriented, the stretching being effected at least in part simultaneously biaxially, after which the film is thermofixed, if necessary, while being kept in stretched condition, the manufacturing process being conducted in such a way that the film possesses the strength properties set out in more detail below.

The film is characterized by an elongation factor D, by which is understood the product of the elongation of a film in percent and the thickness of the film in mm at a specific tensile stress in longitudinal direction and at a specific film width.

For this purpose an average tensile stress usual in processing machines of 200N for a film of 1500 mm width is used. The elongation factor D can e.g. be determined by means of a test strip of 15 mm width and a tensile stress of 2N at a length of 200 mm in a suitable tensile testing machine at an elongation rate of 5 mm/min. and can be calculated as the product of the elongation in % and the film thickness in mm. The elongation factor D is dependent on the temperature and should therefore be determined for each temperature. As contrasted with a value $F_5$, the elongation factor D (mm. %) can also characterize the irreversible portion of the elongation in dynamic, alternating stresses.

The effect of such an alternating stress can be determined with sufficient certainty for practical use, in such a way that the 15 mm wide test strip is stressed under the previously mentioned conditions in 50 cycles for stressing at 23° C. between 2N and 8N and that subsequently on stress relief the remaining irreversible elongation is measured. From this permanent elongation the elongation factor is calculated, while taking the film thickness into account. The elongation factor characterizing this permanent elongation should further be indicated as $D_W$. The chosen tensile stresses of 2N and 8N for a strip of 15 mm width at 23° C. correspond to a tensile stress in a machine of 200N and 800N, respectively, for a film web having a width of 1500 mm.

At a room temperature of 23° C. the film according to the invention for dynamic stresses should have elongation factors for alternating tensile stresses in longitudinal direction of $D_W=0.003$ mm. % or less, preferably of not more than $D_W=0.0025$ mm. %.

It has appeared, for example, that in a film of 0.02 mm thickness after several dynamic stresses of 50 stress variations between 200N and 800N for 1500 mm wide films an elongation of 0.0025 mm. %/0.02 mm=0.125% should be reckoned with, if its strength in longitudinal direction corresponds to $D_W=0.0025$ mm. %. Or, conversely, it can be calculated that a film with $D_W=0.003$ mm. %, which is elongated by dynamic stresses but the residual elongation of which must not exceed 0.1%, should have a thickness of 0.003 mm. %/0.1%=0.03 mm.

For the processing of the films, however, also the temporary overall elongation, i.e. including the reversible portion thereof, may be important. For this reason it is useful to additionally characterize the films by the overall elongation possible, and also for this purpose the elongation factor D can be used. Since the elongation is dependent on the temperature, the indications $D_{23}$ and $D_{80}$ given hereafter represent the single elongations at 23° C. and 80° C. respectively, each time for a tensile stress of 200N for a film having a width of 1500 mm.

In the films according to the invention $D_{23}$ is up to 0.004 mm. %, preferably 0.003 mm. % and less, and moreover $D_{80}=0.05$ mm. % or less, preferably not greater than 0.04 mm. %. The values for $D_{23}$ and $D_{80}$ are determined, as described before, by means of the tensile testing machine, in which the 15 mm wide test strips are stressed with 2N at 23° C. and 80° C., respectively. They indicate the maximum elongation behaviour occurring under stresses approaching practical conditions, which elongation is partly removed, indeed, on stress relief, but should still be taken into account during processing.

In a film having a thickness of 0.02 mm, a width of 1500 mm and a $D_{80}=0.04$ mm. %, e.g. a tensile stress of 200N at 80° C. results in an elongation of 2%. The same elongation of 2% is obtained in a test strip at 80° C. of 15 mm width and 0.02 mm thickness at a tensile stress of 2N. If in practice during film processing elongations occur in the order of about 2% and more, these should be taken into account. By choosing a suitable film with low elongation factors $D_{80}$ and $D_{23}$ it can be ensured that permissible elongations are not exceeded and that the film need not be overdimensioned on account of its elongation behaviour in the dynamic stressing during processing. The elongation factors indicated apply to films having a thickness of about 0.008 mm to 0.06 mm.

Furthermore, the biaxial orientation of the stretched film can be judged in a simple way from the puncture resistance according to German Industrial Specification DIN No. 53,373. In the films according to the invention at 23° C. the damaging strength should be higher than or equal to 6000N/mm² and the damaging energy larger than or equal to 35 J/mm², both calculated on the film thickness, and the damaging elongation should be about equal to 12.5 mm.

The strength values for films can be influenced both by the raw materials and by the manufacturing processed. In the following Table two polypropylene films have been compared which were made from the same raw material (viz. Propathene GW 26, a product of I.C.I. England). Example I represents the film according to the invention, which was stretched simultaneously biaxially in a special process, and Example II is a film which was stretched biaxially, but stepwise, i.e. first transversely and then longitudinally. The films of both examples had been stretched-out, but in the stepwise-stretched film the ratio of longitudinal stretch to transverse stretch was smaller than in the simultaneously biaxially stretched film.

|  | Example I | Example II |
| --- | --- | --- |
| Stretching degree, longitudinally | 1:7.7 | 1:6.1 |
| Stretching degree, transversely | 1:7.0 | 1:9.0 |
| Stretching degree, in the surface | 1:54 | 1:55 |
| Puncture resistance (DIN 53,373): | | |
| Damaging strength | 6800 N/mm² | 6400 N/mm² |
| Damaging energy | 37 J/mm² | 38 J/mm² |
| Damaging elongation | 12.5 mm | 13 mm |
| Elongation factor for alternating stress ($D_W$) | 0.0025 mm. % | 0.005 mm. % |
| Elongation factor at 80° C. ($D_{80}$) | 0.04 mm. % | 0.07 mm. % |
| Elongation factor at 23° C. ($D_{23}$) | 0.003 mm. % | 0.0055 mm. % |

From this it appears that the film according to the invention of Example I is superior to the film according to Example II as regards a smaller elongation in longitudinal direction under dynamic stresses and under once-occurring tensile stresses of the film.

DESCRIPTION OF THE DRAWINGS

FIG. 1 diagrammatically shows elongations and elongation factors for a test strip of 0.02 mm thickness and 15 mm width according to Example I.

FIG. 2 shows part of a film web. The film has a thickness d. The web or a strip cut from a web has a width b. The length of the web or the strip is indicated by 1. The longitudinal direction of the film, which also is the direction of running of the machine during manufacturing and processing, is indicated by the arrow A, extending in the direction of the length 1 of the web and of the strip. The tensile stress and the temporarily or permanently occurring elongations lie in the direction of the arrow A.

The polypropylene film according to the invention is particularly used as carrier or base film and is then distinguished by having only a slight longitudinal elongation at a small film thickness. Preferred applications for which the film can be used advantageously, are base or carrier films for acoustical and optical information, such as magnetic tapes etc., in which during use often dynamic stresses occur; for these films on the one hand no longitudinal elongations can be permitted, but on the other hand a small film thickness is desired in order to allow the winding of great lengths of tape on spools of small diameter.

The film can also be chosen as carrier or base for multicolour printing and in particular also as packaging film, in which case the advantage of the small elongation is especially favourable during the manufacture of the film and the package, e.g. in multicolour printing, in coatings, on re-reeling and dividing into narrower webs and finally on drawing off in the packaging machine.

The film can also advantageously be used for adhesive tapes made in a similar way, which, moreover, must not show any longitudinal elongation after being applied.

The film can also be the carrier or base film for coextruded layers, the strength of which cannot or not substantially be improved by the stretching of the carrier film; in this case the previously mentioned values for the elongation factors etc. only relate to the oriented and stretched carrier film itself.

I claim:

1. A simultaneously biaxially oriented isotactic polypropylene film, resistant to dynamic stresses, particularly tensile stresses in longitudinal direction, which has been stretched in a surface stretch ratio of at least 1:45, and exhibits the following properties:
  (a) a puncture resistance (according to DIN No. 53,373) corresponding to a damaging strength of 6000N/mm$^2$ or more, a damaging energy of 35 J/mm$^2$ or more and a damaging elongation of about 12.5 mm
  (b) an elongation factor $D_W$ of 0.003 mm. % or less, preferably of not more than 0.0025 mm. %, measured as residual irreversible elongation in longitudinal direction after 50 stress variations between 2 and 8N in a test strip of 15 mm width at 23° C.;
  (c) an elongation factor $D_{23}$ of 0.004 mm. % or less, preferably of not more than 0.003 mm. %, measured at a single elongation of a test strip of 15 mm width by a stress of 2N at 23° C.; and
  (d) an elongation factor $D_{80}$ of 0.05 mm. % or less, preferably of not more than 0.04 mm. %, measured at a single elongation of a test strip of 15 mm width by a stress of 2N at 80° C.

2. An information carrier having a tape base or carrier film essentially consisting of the simultaneously biaxially oriented isotactic polypropylene film according to claim 1.

3. Adhesive tape having a base or carrier film comprising the simultaneously biaxially oriented, isotactic polypropylene film according to claim 1.

4. Packaging material having a base or carrier film comprising the smimultaneously biaxially oriented, isotactic polypropylene film according to claim 1.

5. A laminate comprising at least one layer of the simultaneously biaxially oriented, isotactic polypropylene film according to claim 1.

6. A film provided with multicolour printing having a base or carrier film comprising the simultaneously biaxially oriented, isotactic polypropylene film according to claim 1.

* * * * *